United States Patent
Kimoto et al.

(10) Patent No.: US 9,112,859 B2
(45) Date of Patent: Aug. 18, 2015

(54) METHOD AND APPARATUS FOR ELECTRONIC DEVICE ACCESS

(71) Applicant: GOOGLE TECHNOLOGY HOLDINGS LLC, Mountain View, CA (US)

(72) Inventors: Yukiko Kimoto, Mundelein, IL (US); Limor P Marco, Buffalo Grove, IL (US); Akila Varadarajan, Libertyville, IL (US); Michelle N Gattuso, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/048,230

(22) Filed: Oct. 8, 2013

(65) Prior Publication Data

US 2015/0006904 A1 Jan. 1, 2015

Related U.S. Application Data

(60) Provisional application No. 61/841,920, filed on Jul. 1, 2013.

(51) Int. Cl.
*G06F 21/00* (2013.01)
*H04L 29/06* (2006.01)
*G06F 21/31* (2013.01)
*G06F 21/32* (2013.01)
*G06F 21/35* (2013.01)

(52) U.S. Cl.
CPC .......... *H04L 63/0861* (2013.01); *G06F 21/316* (2013.01); *G06F 21/32* (2013.01); *G06F 21/35* (2013.01)

(58) Field of Classification Search
CPC ........ G06F 21/316; G06F 21/32; G06F 21/35
USPC ......................................... 726/7, 16; 713/186
See application file for complete search history.

(56) References Cited

U.S. PATENT DOCUMENTS

| | | | |
|---|---|---|---|
| 7,565,265 B2 | 7/2009 | Kuhlman | |
| 8,255,698 B2 | 8/2012 | Li et al. | |
| 8,683,556 B2 | 3/2014 | Ingrassia et al. | |
| 2012/0185910 A1* | 7/2012 | Miettinen et al. | 726/1 |
| 2013/0082823 A1* | 4/2013 | Mallalieu et al. | 340/5.82 |
| 2013/0167212 A1* | 6/2013 | Azar et al. | 726/7 |
| 2014/0068751 A1* | 3/2014 | Last | 726/16 |
| 2014/0317722 A1* | 10/2014 | Tartz et al. | 726/19 |

* cited by examiner

*Primary Examiner* — Justin T Darrow
*Assistant Examiner* — Hee Song
(74) *Attorney, Agent, or Firm* — Morris & Kamlay LLP

(57) ABSTRACT

A method on an electronic device for a wireless network is described. A plurality of component confidence indicators is determined for a corresponding plurality of authentication components of the electronic device. The plurality of component confidence indicators is grouped into at least first and second sets. A first set confidence indicator is determined based on the component confidence indicators of the first set. A second set confidence indicator is determined based on the component confidence indicators of the second set. An authentication value is determined based on the first set confidence indicator, weighted by a first authentication factor for the first set, and the second set confidence indicator, weighted by the first authentication factor. The electronic device is unlocked based on the authentication value.

16 Claims, 10 Drawing Sheets

Bluetooth Continuous Table

|     | Unique ID | Date      | Start Time | End Time |
|-----|-----------|-----------|------------|----------|
| T1  | Headset1  | 5/27/2013 | 1:00 PM    | 1:00 PM  |
| T2  | Headset1  | 5/27/2013 | 1:00 PM    | 1:04 PM  |
| T3  | Headset1  | 5/27/2013 | 1:00 PM    | 1:06 PM  |
| T4  | Headset1  | 5/27/2013 | 1:00 PM    | 1:10 PM  |
| T5  | Headset1  | 5/27/2013 | 5:20 PM    | 5:20 PM  |
| T6  | Headset1  | 5/27/2013 | 5:20 PM    | 5:25 PM  |
| T7  | Headset1  | 5/27/2013 | 5:20 PM    | 5:28 PM  |
| T8  | Headset1  | 5/28/2013 | 12:58 PM   | 12:58 PM |
| T9  | Headset1  | 5/28/2013 | 12:58 PM   | 1:00 PM  |
| T10 | Headset1  | 5/28/2013 | 12:58 PM   | 1:06 PM  |
| T11 | Headset1  | 5/28/2013 | 5:18 PM    | 5:18 PM  |
| T12 | Headset1  | 5/28/2013 | 5:18 PM    | 5:20 PM  |

Bluetooth Learning Table

|     | Unique ID | Date      | Start Time | End Time | No. of Transactions |
|-----|-----------|-----------|------------|----------|---------------------|
| LT1 | Headset1  | 5/27/2013 | 1:00 PM    | 1:10 PM  | 4                   |
| LT2 | Headset1  | 5/27/2013 | 5:20 PM    | 5:28 PM  | 3                   |
| LT3 | Headset1  | 5/28/2013 | 12:58 PM   | 1:06 PM  | 3                   |
| LT4 | Headset1  | 5/28/2013 | 5:18 PM    | 5:20 PM  | 2                   |
| LT5 | Headset1  | 6/3/2013  | 1:04 PM    | 1:08 PM  | 3                   |
| LT6 | Headset1  | 6/3/2013  | 5:22 PM    | 5:28 PM  | 3                   |
| LT7 | Headset1  | 6/4/2013  | 12:59 PM   | 1:10 PM  | 4                   |
| LT8 | Headset1  | 6/4/2013  | 5:19 PM    | 5:26 PM  | 2                   |

Bluetooth Authorized Table

|     | Unique ID | Auth. Start Time | Auth. End Time | Avg per transaction | Auth. Days | Last Auth. Date | No. of Transactions |
|-----|-----------|------------------|----------------|---------------------|------------|-----------------|---------------------|
| AT1 | Headset1  | 12:58 PM         | 1:10 PM        | 3.5                 | MonTue     | 6/4/2013        | 4 transactions      |
| AT2 | Headset1  | 5:18 PM          | 5:28 PM        | 2.5                 | MonTue     | 6/4/2013        | 4 transactions      |

Match-Ready Table

| | Unique ID | Type | Accuracy |
|---|---|---|---|
| MR1 | Swipe1 | Biometric | 75 |
| MR2 | Bluetooth1 | Non-Biometric | 100 |
| MR3 | WiFi1 | Non-Biometric | 100 |

FIG. 9    940

| Start Time | End Time |
|---|---|
| 9:00 AM | 3:00 PM |
| 9:10 AM | 3:10 PM |
| 9:30 AM | 3:15 PM |
| 9:45 AM | 3:32 PM |
| 10:10 AM | 3:45 PM |
| 10:11 AM | 3:48 PM |
| 10:12 AM | 4:40 PM |
| 10:15 AM | 4:45 PM |
| 10:42 AM | 4:49 PM |
| 10:43 AM | 5:00 PM |
| 10:45 AM | 5:10 PM |
| 11:00 AM | 5:20 PM |
| 11:10 AM | 5:30 PM |
| 11:45 AM | 5:40 PM |

METHOD AND APPARATUS FOR ELECTRONIC DEVICE ACCESS

CROSS-REFERENCE TO RELATED APPLICATIONS

The present application is a non-provisional, which claims the benefit of U.S. Provisional Patent Application No. 61/841,920, filed on Jul. 1, 2013, the contents of which is incorporated herein by reference in its entirety. Also, the present application is related to U.S. Provisional Patent Application No. 61/834,635, filed Jun. 13, 2013.

TECHNICAL FIELD

The disclosure relates to access security for an electronic device.

BACKGROUND

Electronic devices, such as smartphones, tablets, and other electronics, are often used to access information that a user wishes to keep secure or private. For example, a home user may have financial information, bank statements, email accounts, or personal files that they access with a tablet. As another example, a business user may access business email or other confidential information with a smartphone. In order to keep this information secured from unauthorized access, the user often sets a security policy on the electronic device to require a PIN entry, biometric reading, or other security procedure. However, many users consider such security procedures to be cumbersome in their setup and use.

BRIEF DESCRIPTION OF THE DRAWINGS

These and/or other embodiments will become apparent and more readily appreciated from the following description of the embodiments, taken in conjunction with the accompanying drawings of which:

FIG. 6 is a diagram illustrating a continuous table of the authentication system of FIG. 3, according to an embodiment.

FIG. 7 is a diagram illustrating a learning table of the authentication system of FIG. 3, according to an embodiment.

FIG. 8 is a diagram illustrating an authorized table of the authentication system of FIG. 3, according to an embodiment.

FIG. 9 is a diagram illustrating a match-ready table of the authentication system of FIG. 3, according to an embodiment.

FIG. 10, a diagram of a table illustrating one example of detectable time intervals for a unique ID, according to an embodiment.

DETAILED DESCRIPTION

Figure 1:
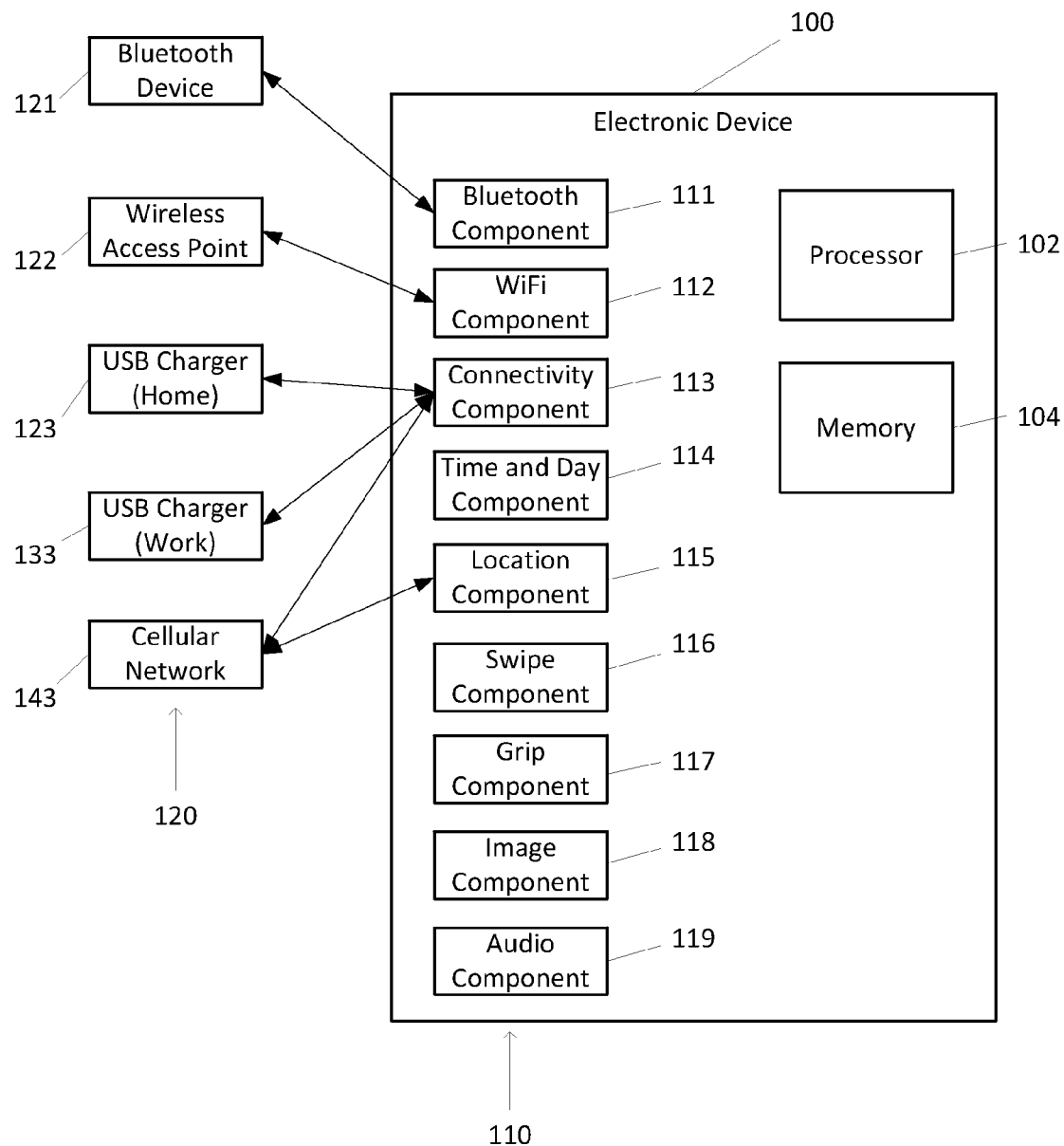
FIG. 1 is a block diagram illustrating an electronic device, according to an embodiment.

Current electronic devices have a vast set of data available, related to swipe patterns, location, WiFi networks, Bluetooth devices, facial recognition, voice data, and other data. These data are also often personal to each user and may be collected and analyzed to determine access patterns or profiles for the user. For example, the user may frequently access the electronic device at related times and days during a week. During those times of access, the electronic device may be connected to a Bluetooth headset, a wireless network, a USB charger, or other devices. The user may also have detectable biometric characteristics when accessing the electronic device. For example, the user may typically use a certain pressure and pattern when "swiping" to access the electronic device. Accordingly, the electronic device may be configured to combine this available data in order to authenticate the user based on which devices are connected, when they are connected, and whether the data fits a previously established history for the user. The electronic device may be configured to bypass a security challenge when the available data suggests that an access attempt is by an authorized user of the electronic device.

The present disclosure is generally directed to a method and system for providing secure access to an electronic device. In particular, the disclosure is directed to determining an authentication value for unlocking the electronic device based on set confidence indicators weighted by an authentication factor.

The present disclosure describes a method on an electronic device for a wireless network. A plurality of component confidence indicators is determined for a corresponding plurality of authentication components of the electronic device. The plurality of component confidence indicators is grouped into at least first and second sets. A first set confidence indicator is determined based on the component confidence indicators of the first set. A second set confidence indicator is determined based on the component confidence indicators of the second set. An authentication value is determined based on the first set confidence indicator, weighted by a first authentication factor for the first set, and the second set confidence indicator, weighted by the first authentication factor. The electronic device is unlocked based on the authentication value.

The present disclosure further describes an electronic device for a wireless network. The electronic device includes a non-transitory memory and a processor configured to retrieve instructions from the memory. The electronic device is configured to determine a plurality of component confidence indicators for a corresponding plurality of authentication components of the electronic device. The electronic device is configured to group the plurality of component confidence indicators into at least first and second sets. The electronic device is configured to determine a first set confidence indicator based on the component confidence indicators of the first set. The electronic device is configured to determine a second set confidence indicator based on the component confidence indicators of the second set. The electronic device is configured to determine an authentication value based on the first set confidence indicator, weighted by a first authentication factor for the first set, and the second set confidence indicator, weighted by the first authentication factor. The electronic device is configured to unlock the electronic device based on the authentication value.

Turning to FIG. 1, a block diagram illustrates one example of an electronic device 100 according to an embodiment. Examples of the electronic device 100 include a mobile phone (e.g., smartphone), a tablet computer, a laptop, or other computing device. The electronic device 100 includes a processor 102 and a memory 104, as described herein. The electronic device 100 further includes a plurality of authentication components 110. In the embodiment shown in FIG. 1, the plurality of authentication components 110 includes a Bluetooth component 111, a WiFi component 112, a connectivity component 113, a Time and Day component 114, a location component 115, a swipe component 116, a grip component 117, an image component 118, and an audio component 119. However, alternative embodiments of the electronic device 100 may have additional, or fewer, authentication components 110. While the authentication components 110 are illustrated and described herein as discrete components, they may be combined or divided in alternative embodiments.

The plurality of authentication components 110 provides various features to the electronic device 100. The authentication components 110 in one example are configured to detect, sense, or receive inputs from external devices (e.g., external devices 120), the user of the electronic device 100, or the environment. In particular, the authentication components 110 may be configured to detect, sense, or receive inputs to identify unique IDs when the user attempts to access or "unlock" the electronic device 100 from a dormant or "locked" state. The electronic device 100 may be configured to unlock the electronic device 100 based on the unique IDs without requiring a security challenge (e.g., PIN entry, swipe pattern, biometric reading) performed by the user. The authentication components 110 may be grouped based on various characteristics, including their relative accuracy, relative importance, or type of data provided (e.g., biometric or non-biometric).

The Bluetooth component 111 provides a Bluetooth capability to the electronic device 100 and allows connectivity to one or more other Bluetooth-enabled devices, such as a Bluetooth device 121. The Bluetooth device 121 may be a Bluetooth-enabled headset, Bluetooth-enabled automobile, or other Bluetooth-enabled device. The Bluetooth component 111 in one example detects Bluetooth-enabled devices and identifies those devices by a unique ID, such as a Bluetooth hardware address, Bluetooth device name, Bluetooth device class, or any combination thereof. The Bluetooth component 111 may identify unique IDs for Bluetooth-enabled devices that are detected, connected with the Bluetooth component 111, or both. Alternative forms of the unique ID will be apparent to those skilled in the art.

The WiFi component 112 provides a wireless network capability and allows the electronic device 100 to connect to one or more wireless-enabled communication devices or wireless networks, such as a wireless access point 122. The WiFi component 112 may implement one or more wireless standards, such as one or more of the IEEE 802.11 family of standards. The WiFi component 112 in one example detects wireless-enabled devices and identifies those devices by a unique ID, such as a hardware address (e.g., medium access control (MAC) address), service set identification (SSID), basic service set identification (BSSID), received signal strength indicator (RSSI), internet protocol (IP) address, or any combination thereof. The WiFi component 112 may identify unique IDs for wireless-enabled communication devices or networks that are detected, connected with the WiFi component 112, or both. Alternative forms of the unique ID will be apparent to those skilled in the art.

The connectivity component 113 provides a communication capability to other electronic devices. The connectivity component 113 may include one or more antennas, wired or wireless interfaces, ports, or other connectivity mechanisms (not shown). The connectivity component 113 may be coupled to another device that provides for additional antennas, interfaces, ports, or connectivity mechanisms, such as a universal serial bus (USB) hub. In the embodiment shown in FIG. 1, the connectivity component 113 is connectable to a first USB charger 123, a second USB charger 133, and a cellular or other wireless network 143. The USB charger 123 may be located at a home of the user of the electronic device 100 while the USB charger 133 may be located at a work location of the user of the electronic device 100. The cellular network 143 may include a long term evolution (LTE) network, code division multiple access (CDMA) network, Universal Mobile Telecommunications System (UMTS) network, or other wireless network. The connectivity component 113 may be connected to the USB chargers 123 and 133, the cellular network 143, or other devices either separately, concurrently, or in any combination thereof. The connectivity component 113 in one example detects connected devices and identifies those devices by a unique ID. For example, the connectivity component 113 may identify a USB device by a USB hardware address, USB device name, other identifying information, or any combination thereof. The connectivity component 113 may identify a cellular network by a cell ID, service provider name, network address, other identifying information, or any combination thereof. Alternative forms of the unique ID will be apparent to those skilled in the art. Additional examples of other devices for connection to the connectivity component 113 include a High-Definition Multimedia Interface (HDMI) device, radio frequency identification (RFID) device, or infrared (IR) communication device.

The Time and Day component 114 provides a current time and current day for various actions and events. For example, if the user makes an attempt to unlock the electronic device 100, the Time and Day component 114 may provide the current time and day for that attempt or any unique IDs detected during the unlock attempt.

The location component 115 provides a location service for the electronic device 100. For example, the location component 115 is configured to determine a current location of the electronic device 100 based on at least one of Global Positioning System (GPS) data, WiFi data (e.g., from the WiFi component 112 and wireless access point 122), Google® location services, cell IDs (e.g., from the connectivity component 113 and cellular network 143), or any combination thereof. The location component 115 in one example determines a unique ID based on the location of the electronic device 100 such that the unique ID indicates the location (e.g., a street address, latitude/longitude coordinates, etc.).

The swipe component 116 provides a swipe feature for the electronic device 100 and allows the user to interact with a touch screen (not shown) of the electronic device 100. For example, the swipe component 116 may sense a user's input in the form of a touch signal (e.g., a biometric input). The swipe component 116 in one example analyzes the sensed touch signal to determine one or more characteristics of the user's input (e.g., duration, pressure, X and Y coordinates, or size). The swipe component 116 in one example determines a unique ID for the user's input based on the characteristics. The unique ID for the swipe component 116 may be implemented as a data structure, user profile, or other format.

The grip component 117 provides a grip analysis feature for the electronic device 100. The grip component 117 in one example includes one or more sensors (not shown) that sense a user's input (e.g., a biometric input) in the form of the manner in which the user grips the electronic device 100. Examples of the sensors include gyroscopes, accelerometers, motion sensors, or position sensors. The grip component 117 in one example analyzes the orientation of the electronic device 100 to determine one or more characteristics of the user's grip. The grip component 117 in one example determines a unique ID for the user's grip based on the characteristics. The unique ID for the grip component 117 may be implemented as a data structure, user profile, or other format.

The image component 118 provides an image-taking feature to the electronic device 100. For example, the image component 118 may include a camera (e.g., charged coupled device (CCD) or complementary metal-oxide-semiconductor (CMOS) device) for capturing still or moving images. The image component 118 may be configured for facial detection of the user. For example, the image component 118 may use facial detection algorithms to identify the user based on full or partially recognized facial features (e.g., eye position, nose position, etc.). The image component 118 in one example determines a unique ID (e.g., a biometric input) based on the identified facial features. The unique ID for the image component 117 may be implemented as a data structure, user profile, or other format.

The audio component 119 provides an audio recording feature to the electronic device 100. For example, the audio component 119 may include a microphone or other audio capture device. The audio component 119 may be configured for voice recognition of the user, speech recognition of the user, or other sounds associated with the environment (e.g., background noise). For example, the audio component 119 may use voice recognition algorithms to recognize a keyword spoken by the user and captured as audio by the audio component 119. The audio component 119 determines a unique ID (e.g., a biometric input) based on the captured audio. The unique ID for the audio component 117 may be implemented as a data structure, user profile, or other format.

Figure 2:
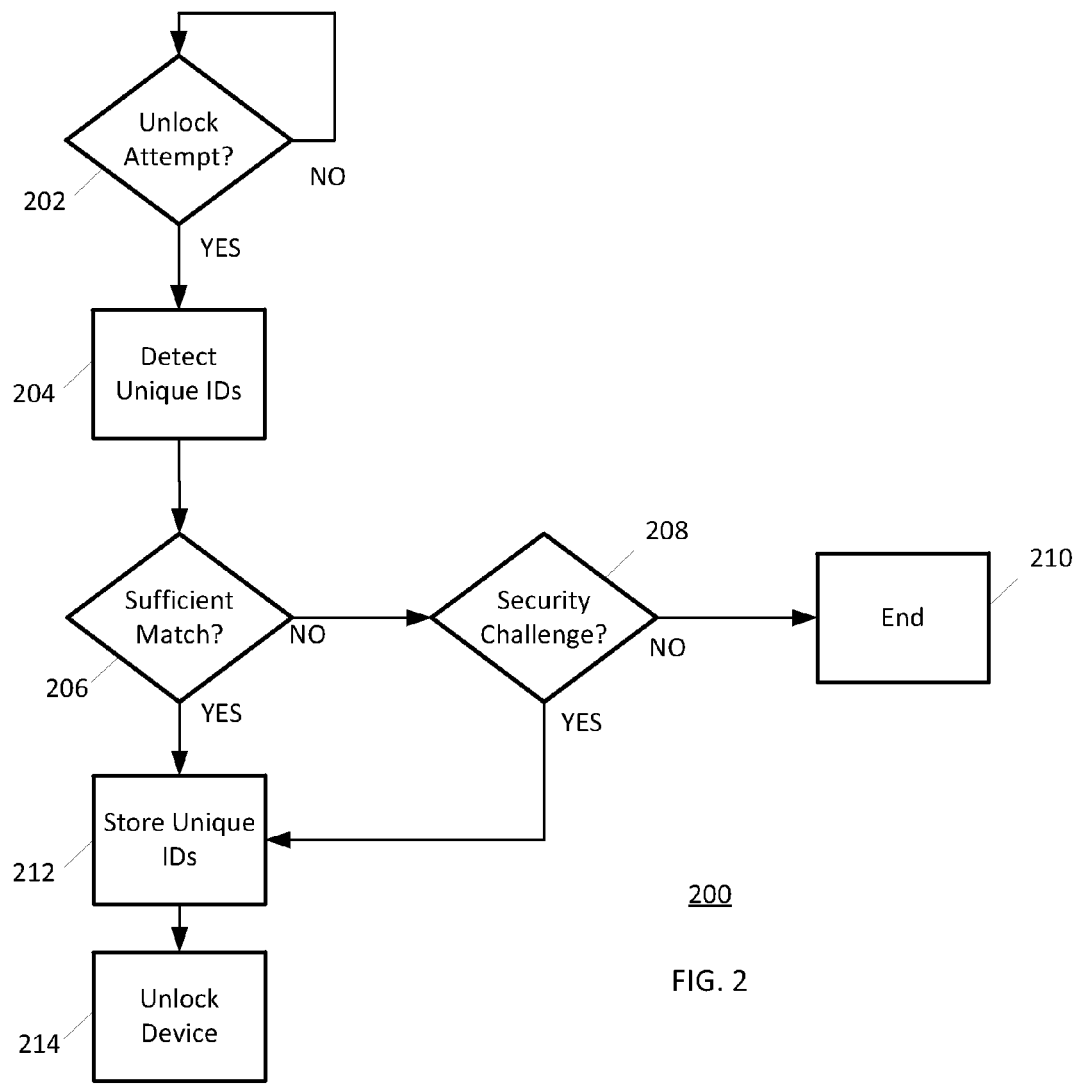
FIG. 2 is a flowchart of a method for authentication that may be performed by the electronic device of FIG. 1, according to an embodiment.

Turning to FIG. 2, a flowchart 200 illustrates one example of a method for authentication that may be performed by the electronic device 100. The electronic device 100 waits (NO at 202) for an unlock attempt by a user. Upon the unlock attempt (YES at 202), the electronic device 100 detects (204) unique IDs from the authentication components 110. The number of unique IDs detected by each authentication component 110 may be a fixed number or variable number. For example, the WiFi component 112 may detect several SSIDs and return each as a separate unique ID during a single instance of the detection step. In contrast, other components (e.g., the swipe component 116, grip component 117, image component 118, or audio component 119) may be configured to provide only a single unique ID for each instance of the detection step.

The user of the electronic device 100 may attempt to unlock the electronic device 100 many times throughout a day, week, or other period of time. Accordingly, the electronic device 100 may scan over a period of time (e.g., several days, several weeks, or longer) for the unique IDs. The electronic device 100 in an embodiment detects the unique IDs upon the unlock attempt, instead of continuously, which may reduce power consumption and thus increase battery life of the electronic device 100.

After detection of the unique IDs, the electronic device 100 determines (206) whether the detected unique IDs provide a sufficient match for authentication of the user. The electronic device 100 thus determines whether the unlock attempt is successful or unsuccessful based on the detected unique IDs. The sufficiency of the match may be based on the number of unique IDs detected, the history related to those unique IDs (including insufficient history for comparison), which authentication component 110 detected the unique ID, or other factors. If the match is insufficient (NO at 206), the electronic device 100 performs a security challenge (208) to authenticate the user. Upon a failure of the security challenge (NO at 208), the electronic device 100 may end (210) the unlock attempt and discard the detected unique IDs. Alternatively, the electronic device 100 may allow multiple security challenges.

Upon a successful unlock through a sufficient match (YES at 206) or successful security challenge (YES at 208), the electronic device 100 stores (212) the detected unique IDs and unlocks (214) for the user. Because either the unique ID match or the security challenge was successful, the user has been authenticated, and the electronic device 100 stores the detected unique IDs (e.g., as a history) for future authentication matches.

The electronic device 100 in an embodiment "learns" the unique IDs from the authentication components 110 which correspond to the authorized user. The electronic device 100 stores those corresponding unique IDs for future authentication matching, as opposed to having the user of the electronic device 100 manually enter various unique IDs for matching. In alternative embodiments, the electronic device 100 may be configured to use a combination of learning and manual entry of the unique IDs.

The electronic device 100 in one example processes the unique IDs to form authentication data. In one example, the processing includes a determination of start times and end times for the unique IDs. In another example, biometric-based or profile-based unique IDs (e.g., those from the swipe component 116, the grip component 117, the image component 118, or audio component 119) may be processed to determine a "match-ready" unique ID or profile for matching purposes. Examples of such processing include neural network processing, heuristics, statistical analysis, or other forms of processing, which will be apparent to those skilled in the art. The electronic device 100 may be configured to perform the processing on the unique IDs when a sufficient number of unique IDs have been detected over time. For example, the electronic device 100 may wait for at least twenty days of data before processing the unique IDs. The type of processing, sufficient number of unique IDs, or duration of time may be preselected or dynamically determined based on the unique IDs. Additionally, the type of processing, sufficient number of unique IDs, and duration of time may be the same or different for each authentication component 110.

Figure 3:
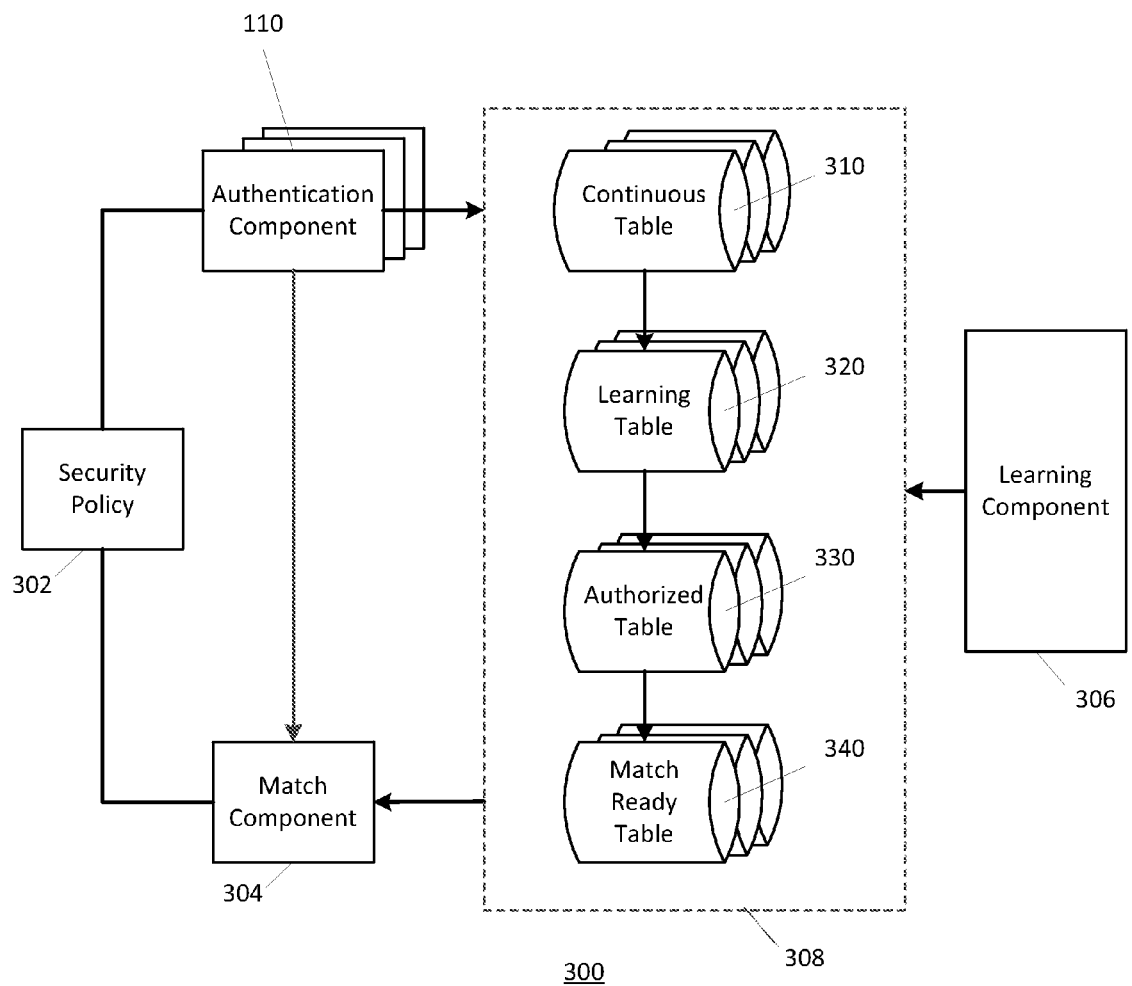
FIG. 3 is a block diagram illustrating an authentication system that may be implemented by the electronic device of FIG. 1, according to an embodiment.

Turning to FIG. 3, an authentication system 300 that may be implemented by the electronic device of FIG. 1, according to an embodiment. The authentication system 300 includes the authentication components 110, a security policy 302 for the electronic device 100, a match component 304, a learning component 306, and a database 308. The security policy 302 in this embodiment is applied to the electronic device 100 for control of the authentication components 110 and match component 304. The security policy 302 may be implemented as a portion or module of an operating system (not shown) of the electronic device 100. The authentication components 110 are configured to provide the detected unique IDs to the database 308 based on the security policy 302. The match component 304 performs the step of matching (206) based on authentication data within the database 308. The match component 304 may be configured to perform a lookup of authentication data and a current set of detected unique IDs in the database 308. In another example, the match component 304 may be configured to receive the current set of detected unique IDs, directly or indirectly, from the authentication components 110. In this example, the match component 304 is configured to perform the lookup of the authentication data within the database 308 to perform the step of matching.

The learning component 306 performs processing on the database 308 to generate the authentication data based on the unique IDs. As described above, the learning component 306 may perform neural network processing, heuristics, statistical analysis, or other forms of processing.

The database 308 comprises a historical database for unique IDs. In the embodiment of FIG. 3, the database 308 comprises one instance of a continuous table 310, a learning table 320, an authorized table 330, and a match-ready table 340 for each of the authentication components 110. Accordingly, there are nine instances of each table 310, 320, 330, and 340 for a total of 36 tables. However, alternative embodiments may use a single instance of each table 310, 320, 330, and 340 for all of the authentication components 110 (thus, a total of four tables). Various tables may be combined or omitted and other embodiments will be apparent to those skilled in the art. For clarity, one instance of the tables 310, 320, 330, and 340 will be discussed herein.

The continuous table 310 stores detected unique IDs and associated data, for example, as a status indicator or table entry for the unique ID. The associated data in one example includes a date that a unique ID was detected, a start time for an appearance of the unique ID, and an end time for the appearance of the unique ID. Additional data or parameters that may be stored with the unique ID will be apparent to those skilled in the art. The electronic device 100 in one example creates an entry in the continuous table 310 corresponding to the authentication component 110 from which a unique ID is initially detected upon an unlock attempt. Upon a subsequent unlock attempt, the electronic device 100 may determine whether the unique ID is still detected. If detected, the electronic device 100 may update the end time for the corresponding entry. If the unique ID is not detected (e.g., disconnected from the electronic device 100), the electronic device 100 may remove the unique ID's entry from the continuous table 310 and create a new, corresponding entry in the learning table 320.

The learning table 320 stores unique IDs and associated data. The associated data in one example includes the date, the start time, the end time, and a number of sequential transactions (e.g., unlock attempts) in which the unique ID was detected. Additional parameters or associated data that may be stored, or omitted, will be apparent to those skilled in the art. The learning component 306 in one example processes entries from the learning table 320 to determine and create entries for the authorized table 330, as described herein.

The authorized table 330 stores authentication data for the unique IDs and associated data that may be used to authenticate the user. The authentication data in one example includes the unique ID and at least one of an authorized start time, an authorized end time, an average number of transactions, authorized days, a last authentication date, an access frequency, or a number of transactions. Additional parameters or associated data that may be stored, or omitted, will be apparent to those skilled in the art.

The match-ready table 340 stores match indications of which unique IDs are ready for use by the match component 304. The match indications in one example include the unique ID and an accuracy of the corresponding authentication component 110 (e.g., a biometric accuracy). The match indications in a further example include a type for the unique ID (e.g., biometric, non-biometric, high priority, low priority, etc.). Additional parameters or associated data that may be stored, or omitted, will be apparent to those skilled in the art.

Figure 4:
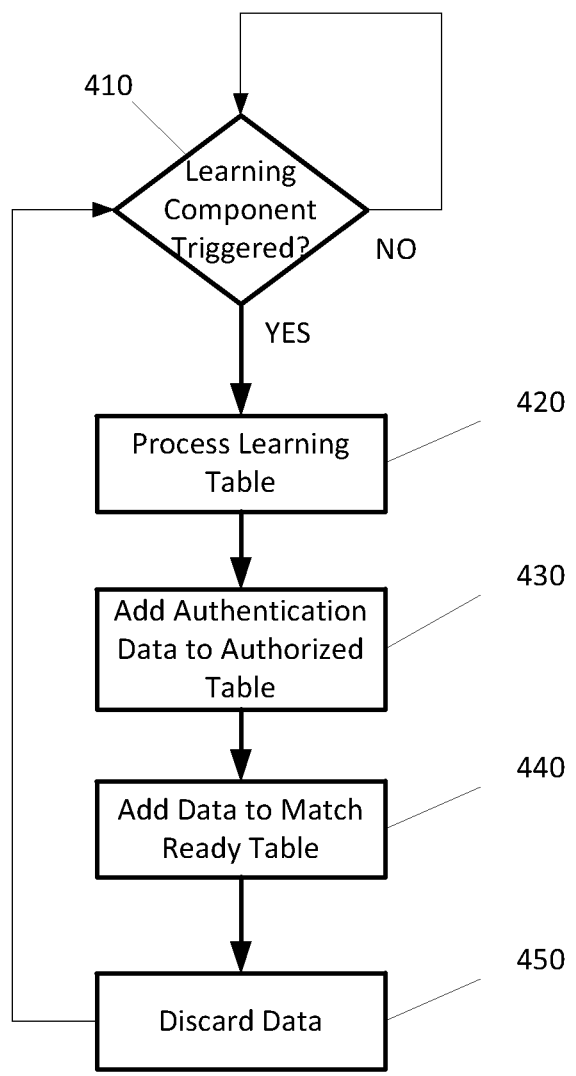
FIG. 4 is a flowchart of a method for processing data gathered by the electronic device of FIG. 1 using the authentication system of FIG. 3, according to an embodiment.
Figure 5:
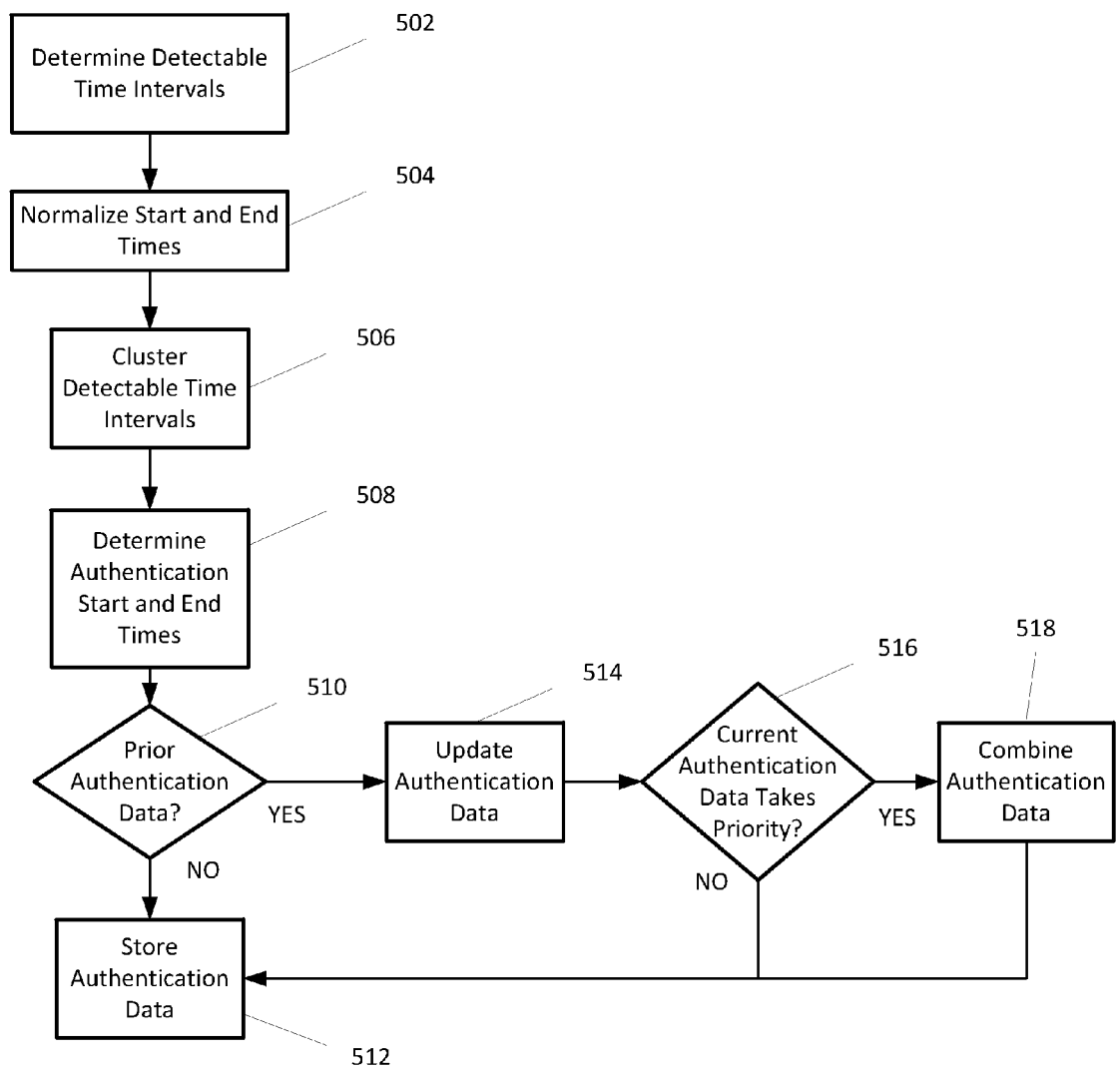
FIG. 5 is a flowchart of a method for storing authentication data that may be performed by the electronic device of FIG. 1, according to an embodiment.

Turning to FIG. 4, a flowchart 400 illustrates an embodiment of a method for processing data gathered by the electronic device 100 of FIG. 1 using the authentication system 300. The learning component 306 waits for a trigger from the electronic device 100. The trigger may be a fixed timer (e.g., every 20 days), a dynamic timer (e.g., 20 days for a first trigger, and 5 days for subsequent triggers), or an occurrence of an event. Examples of events include the occurrence of a number of unlock attempts (e.g., one hundred unlock attempts) or upon one or more tables in the database 308 reaching a preselected size. Other examples of triggers will be apparent to those skilled in the art.

Upon the trigger (YES at 410), the learning component 306 processes (420) the learning table 320 to determine the authentication data. The learning component 306 in one example determines the authentication data based on at least three entries from the learning table 320. The learning component 306 adds (430) the authentication data to the authorized table 330. The learning component 306 adds (440) match indications to the match-ready table. The learning component 306 may add a match indication for unique IDs with sufficient user history for matching. The learning component 306 may add a match indication after a predetermined quantity of authentication data (e.g., a number of transactions, a number of entries, etc.) is stored in the authorized table. The learning component 306 may discard (450) data from the learning table 320 that are not sufficient for creation of authentication data. For example, detectable time intervals that do not match with other detectable time intervals to form a cluster may be discarded after a discard threshold has been reached. Additionally, the learning component 306 may discard data from the authorized table 330 or the match-ready table 340 where that data has not been used to authenticate the user, based on the last authorization date.

Turning to FIGS. 5-9, a flowchart 500 illustrates an embodiment of a method for storing authentication data that may be performed by the electronic device 100 of FIG. 1, according to an embodiment. FIGS. 6, 7, and 8 are diagrams illustrating embodiments of a continuous table 610, a learning table 720, and an authorized table 830, respectively, for the Bluetooth component 111. FIG. 9 is a diagram of a match-ready table 940. The electronic device 100 in one embodiment performs the method of flowchart 500 for unique IDs from non-biometric authentication components 110 (e.g., the Bluetooth component 111, WiFi component 112, connectivity component 113, and location component 115).

Referring to the embodiment of FIG. 6, the Bluetooth component 111 detects a Bluetooth-enabled headset with a unique ID "Headset1" ("Headset1 device") over a period of time including times T1, T2, T3, . . . T11, to T12. Each time T1 to T12 represents a consecutive successful unlock attempt by a user when the Headset1 device was detected. At T1, the Headset1 device is initially detected and the electronic device 100 creates a corresponding entry in the continuous table 610 with the date and time. The electronic device 100 updates the end time for the entry at subsequent unlock attempts (T2, T3, and T4). After an inactivity time for the Headset1 device, or upon an unlock attempt when the Headset1 device is not detected, the electronic device 100 determines (502) a detectable time interval for the Headset1 device as a start time and end time when the Headset1 device was detected (e.g., 1:00 pm to 1:10 pm). In one example, the authentication components 110 determine a plurality of detectable time intervals. In another example, the learning component 306 determines the plurality of detectable time intervals. The electronic device 100 removes the entry from the continuous table 610 and creates a corresponding entry LT1 in the learning table 720. The number of transactions in the entry LT1 corresponds to the number of successful unlock attempts (e.g., the four attempts at 1:00 pm, 1:04 pm, 1:06 pm, and 1:10 pm). Analogous entries in the continuous table 610 at T5, T6, and T7 correspond to an entry LT2 of the learning table 720. Analogous entries in the continuous table 610 at T8, T9, and T10 correspond to an entry LT3 of the learning table 720. Analogous entries in the continuous table 610 at T11 and T12 correspond to an entry LT4 of the learning table 720.

The electronic device 100 normalizes (504) the start and end times for the entries in the learning table 720 to create a normalized set of detectable time intervals. The electronic device 100 may normalize the start and end times prior to entry into the learning table 720 (e.g., by the authentication components 110) or after entry (e.g., by the learning component 306). In one example, the electronic device 100 normalizes the start and end times to be at single minute intervals. For example, times of 1:00:20 pm, 1:00:44 pm, and 1:00:03 pm may be normalized to 1:00:00 pm. In another example, the electronic device 100 normalizes the start and end times to be at two minute, five minute, or other intervals. The normalization for the start and end times may use a same or different interval. For example, the start times may be normalized to 15 minute intervals while the end times are normalized to 30 minute intervals. The intervals may be preselected or determined based on the detectable time intervals. For example, a larger number of detectable time intervals may be normalized with a larger interval to provide closer matching of the start and end times.

The learning component 306 clusters (506) the detectable time intervals for the unique IDs. In one embodiment, the learning component 306 clusters the detectable time intervals with respective start times and end times that are within a preselected threshold (e.g., 30 minutes, 1 hour, 3 hours, etc.). For example, the learning component 306 selects a normalized set of time intervals with adjacent normalized start times and with adjacent normalized end times. Referring to FIG. 7, the learning component 306 clusters the LT1, LT3, LT5, and LT7 entries into a first cluster and clusters the LT2, LT4, LT6, and LT8 entries into a second cluster. In alternative embodiments, the electronic device 100 may cluster the entries before normalizing the start and end times. The learning component 306 determines (508) authentication data, including an authentication start time, based on the start times of the cluster, and an authentication end time, based on the end times of the cluster. In the embodiment of FIG. 7, the learning component 306 selects an earliest start time for each cluster (12:58 pm and 5:18 pm) as the authentication start times and the latest start time for each cluster (1:10 pm and 5:28 pm) as the authentication end times. An alternative embodiment is described with reference to FIG. 10.

After determining the authentication start times and authentication end times, the learning component 306 determines (510) whether prior authentication data (e.g., a prior instance of authentication data for the unique ID) exists within the database 308 (e.g., within the authorized table 330 or match-ready table 340). If prior authentication data is not found (NO at 510), the learning component 306 stores (512) the authentication data in the database 308. For example, the learning component 306 stores the current authentication data as a new entry within the authorized table 330. Referring to FIG. 8, the learning component 306 creates an entry AT1 in the authorized table 830 for the LT1, LT3, LT5, and LT7 entries and creates an entry AT2 in the authorized table 830 for the LT2, LT4, LT6, and LT8 entries. The learning component 306 determines an average number of transactions for the entry AT1 by averaging the number of transactions for each entry LT1, LT3, LT5, and LT7 (i.e., 4, 3, 3, and 4, respectively). The learning component 306 determines the authorized days for the entry AT1 based on the corresponding dates for the start times and end times. As shown in FIG. 7, the learning component 306 determines the authorized days to be Mondays and Tuesdays based on the dates May 27, 2013, May 28, 2013, Jun. 3, 2013, and Jun. 4, 2013. The learning component 306 determines a number of transactions for the entry AT1 by the number of entries used (i.e., the four entries: LT1, LT3, LT5, and LT7). The learning component 306 creates the entry AT2 analogously to the entry AT1 (i.e., based on the LT2, LT4, LT6, and LT8 entries).

The electronic device 100 in one embodiment updates the authentication data (e.g., the last authorization day, the number of transactions, the access frequency) upon a successful unlock attempt using the authentication data. For example, if the Headset1 device is used to authenticate the user at 5:20 pm on Jun. 10, 2013, the electronic device 100 updates the last authentication date to Jun. 10, 2013 and increments the number of transactions to 5 transactions. The electronic device 100 may update authentication data in the authorized table 330, the match-ready table 340, or both.

If the learning component 306 determines (YES at 510) that prior authentication data exists for a same unique ID, the learning component 306 updates (514) the authentication data in the authorized table 330. The learning component 306 determines (516) whether the current authentication data takes priority over prior authentication data. The learning component 306 in one embodiment determines the priority based on at least one of the last authentication date, the number of transactions, or the access frequency for the current authentication data and the prior authentication data. For example, if the prior authentication data has not been used within a predetermined threshold (e.g., several months), or has not been used as many times as the current authentication data, the learning component 306 may determine that the current authentication data takes priority. Other thresholds or factors for determining priority of the authentication data will be apparent to those skilled in the art.

If the current authentication data does not take priority, the learning component 306 proceeds to step 512. If the current authentication data takes priority, the learning component 306 combines (518) or normalizes the prior authentication data with the current authentication data. For example, the learning component 306 may normalize an authenticated start time of 5:18 pm for current authentication data to a one hour interval (e.g., 5:00 pm) in order to provide an overlap with prior authentication data with an authenticated start time of 5:28 pm. The learning component 306 may combine the current and prior authentication data to gradually move the authentication start and end times towards a new schedule of the user.

The learning component 306 in one embodiment discards authentication data as part of the updating step (512). The learning component 306 may discard authentication data based on a lack of use, overlap with other authentication data, or other factors which will be apparent to those skilled in the art. For example, if authentication data exists in the database 308 but has not been used to authenticate the user within a discard threshold (e.g., six months), the learning component 306 may delete that authentication data from the database 308. The discard threshold may be fixed or dynamically determined (e.g., based on available authentication data in the database 308).

Turning to FIG. 10, a table 1000 illustrates one example of detectable time intervals for a unique ID, according to an embodiment. In this alternative embodiment, the learning component 306 performs additional processing on clusters of detectable time intervals to select the authentication start times and authentication end times. As shown in FIG. 10, the learning component 306 normalizes the start times and end times to one minute intervals and sorts the start times and end times.

After the normalization and sorting, the learning component 306 selects the authentication start time such that a number of subsequent start times, within a first time threshold of the authentication start time, is maximized. For example, where the first time threshold is thirty minutes, the number of subsequent start times to the first entry of 9:00 AM is two (i.e., 9:10 AM and 9:30 AM). However, the number of subsequent start times to the entry of 9:45 AM is four (i.e., 10:10 AM, 10:11 AM, 10:12 AM, 10:15 AM). Accordingly, the learning component 306 selects the entry of 9:45 AM as the authentication start time. In case of multiple entries with a same number of subsequent start times, the learning component 306 may select an earliest entry. In a case when the maximum number of subsequent start times does not meet a selection threshold, the learning component 306 may exit the processing without storing authentication data. The selection threshold may be based on the number of entries in the table 1000, for example, 25% of the number of entries. Alternatively, the selection threshold may be based on a minimum threshold, for example, at least three entries. The electronic device 100 may avoid storing authentication data with a low likelihood of successful authentication of the user.

After the normalization and sorting, the learning component 306 also selects the authentication end time such that a number of previous end times, within a second time threshold of the authentication end time, is maximized. The first time threshold and the second time threshold may be the same or different. In the example of FIG. 10, a second time threshold of thirty minutes provides the last entry of 5:40 PM with three previous end times (i.e., 5:10 PM, 5:20 PM, and 5:30 PM). The learning component 306 may select the entry of 5:10 PM as the authentication end time to provide a maximum number of previous end times (i.e., 4:40 PM, 4:45 PM, 4:49 PM, and 5:00 PM). In a case when the maximum number of previous end times does not meet a threshold, the learning component 306 may exit the processing without storing authentication data.

Figure 11:
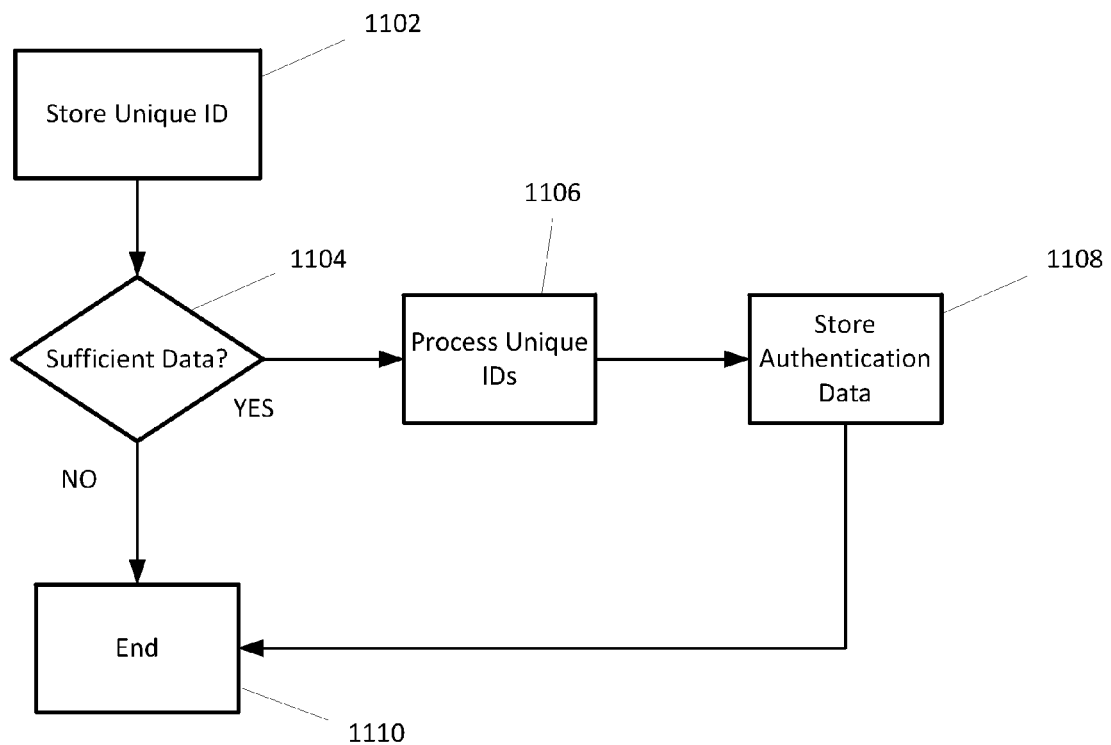
FIG. 11 is a flowchart of another method for storing authentication data that may be performed by the electronic device of FIG. 1, according to an embodiment.

FIG. 11 is a flowchart 1100 of another method for storing unique IDs that may be performed by the electronic device of FIG. 1. The method of FIG. 11 in one example is performed by the learning component 306 for unique IDs from biometric-based or profile-based unique IDs (e.g., those from the swipe component 116, the grip component 117, the image component 118, or audio component 119) to perform the step of storing (212, FIG. 2). Biometric-based authentication components 110 may not be capable of 100% accuracy, as will be understood by those skilled in the art. Accordingly, the learning component 306 may store the accuracy of the corresponding authentication component 110 with the authentication data.

The learning component 306 receives and stores (1102) the unique ID in the learning table 320. The learning component 306 determines (1104) whether sufficient data exists to determine authentication data based on the unique IDs for the corresponding authentication component 110. Processing of the unique IDs for biometric-based or profile-based authentication components 110 may require many unique IDs for processing such as neural network processing. The learning component 306 may wait for a threshold number of unique IDs before processing. The threshold number of unique IDs may be the same or different for each authentication component 110. The learning component 306 may adjust the threshold number over time. For example, to provide a high initial number of unique IDs (e.g., 500 unique IDs) for a first processing and a lower subsequent number of unique IDs (e.g., 100 unique IDs) for subsequent processing.

If sufficient data exists for processing, the learning component 306 processes (1106) the unique IDs using neural network processing, heuristics, statistical analysis, or other forms of processing to generate authentication data based on the unique IDs (e.g., a profile of the user). In one example, the learning component 306 performs neural network processing on unique IDs from the swipe component 116 to determine a swipe profile for authentication data. The match component 304 may use the authentication data, as described above. In an embodiment, the learning component 306 processes both unique IDs and previous authentication data to create new authentication data. The learning component 306 stores (1108) the authentication data in the database 308. If sufficient data does not exist for processing, the method ends (1110).

Figure 12:
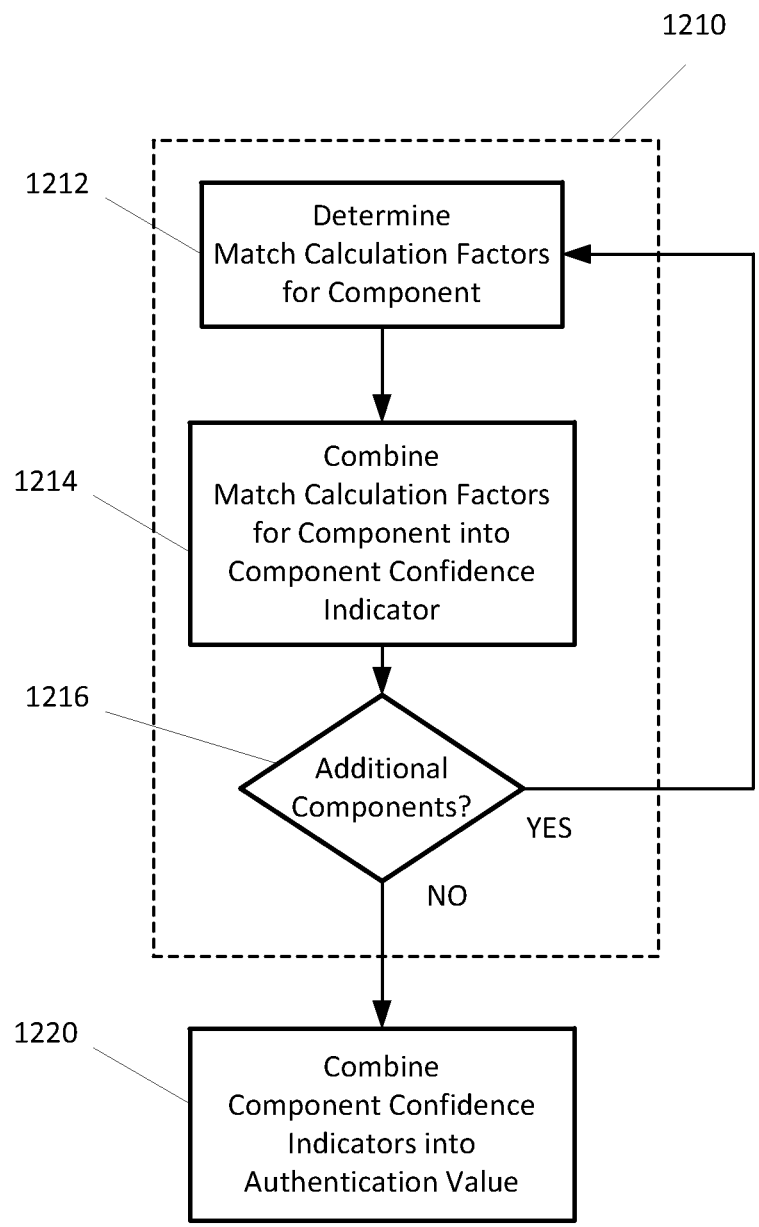
FIG. 12 is a flowchart of a method for determining an authentication value that may be performed by the electronic device of FIG. 1, according to an embodiment.

Turning to FIG. 12, a flowchart 1200 illustrates one embodiment of a method for determining an authentication value that may be performed by the electronic device 100. As described above with reference to FIG. 2, the electronic device 100 determines (206) whether the detected unique IDs provide a sufficient match for authentication of the user. The electronic device 100 thus determines whether the unlock attempt is successful or unsuccessful based on the detected unique IDs. The match component 304 performs the step of matching (206) based on authentication data within the database 308, for example, by determining (1200) an authentication value based on the authentication data. The match component 304 in one example determines that the match is sufficient (YES at 206) when the authentication value meets or exceeds an authentication threshold.

The match component 304 determines (1210) a plurality of component confidence indicators for a corresponding plurality of authentication components 110 of the electronic device 100. After determination of the component confidence indicators, the match component 304 combines (1220) the component confidence indicators and determines the authentication value (as described with reference to FIG. 15). The match component 304 may select the plurality of authentication components 110 for the determination (1210) based on the unique IDs detected (204) for the unlock attempt. In one example, the match component 304 selects only those authentication components 110 from which at least one unique ID has been received (e.g., detected) for the current unlock attempt. In another example, the match component 304 selects an authentication component 110 (e.g., the Time and Day component 114) for each determination (1210) of the plurality of component confidence indicators.

To determine the plurality of component confidence indicators, the match component 304 determines (1212) match calculation factors for the plurality of authentication components 110 (as described with reference to FIGS. 13 and 14). The match component 304 may determine multiple sets of match calculation factors for an authentication component 110, for example, if multiple unique IDs are detected by a same authentication component 110. Accordingly, if unique IDs of "Bluetooth1" and "Bluetooth2" are detected by the Bluetooth component 111 during the current unlock attempt, the match component 304 may determine a first set of match calculation factors for Bluetooth1 and a second set of match calculation factors for Bluetooth2.

The match component 304 may obtain authentication data from the historical database 308 (e.g., from the authorized table 330) to determine the match calculation factors. The match component 304 then determines the match calculation factors based on the authentication data. Once the match calculation factors for an authentication component 110 are determined, the match component 304 may combine (1214) the match calculation factors (e.g., the sets for Bluetooth1 and Bluetooth2) to determine the component confidence indicator for the authentication component 110. The match component 304 may combine the match calculation factors for an authentication component 110 using a mathematical average, weighted average, or other formula. The match component 304 determines (1216) whether additional selected authentication components 110 remain for the unlock attempt, and if so, determines (1212) and combines (1214) the match calculation factors for each remaining authentication component 110.

Figure 13:
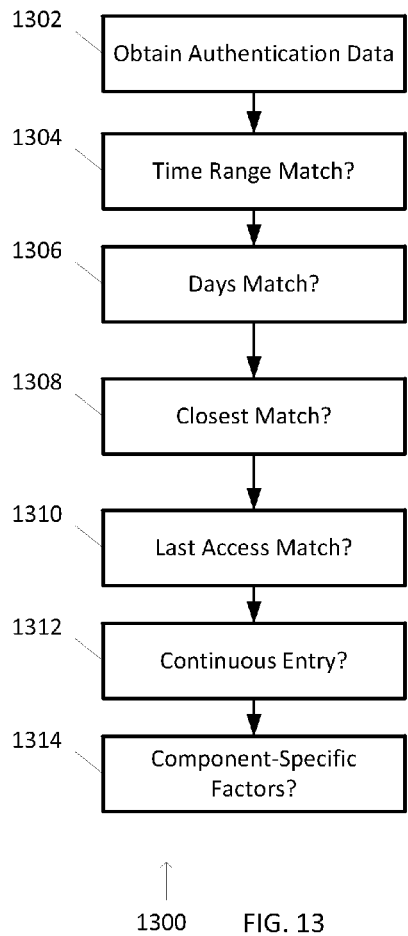
FIG. 13 is a flowchart of a method for determining match calculation factors for a unique ID that may be performed by the electronic device of FIG. 1, according to an embodiment.
Figure 14:
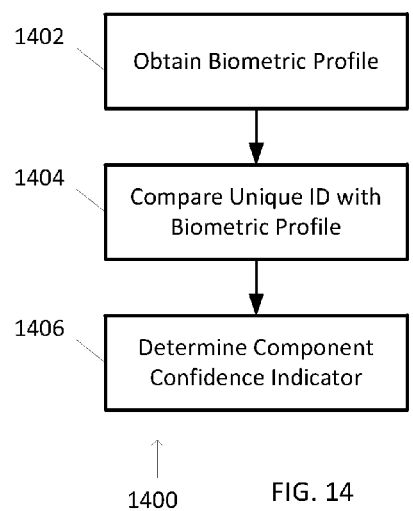
FIG. 14 is a flowchart of another method for determining match calculation factors for a unique ID that may be performed by the electronic device of FIG. 1, according to an embodiment.

Turning to FIGS. 13-14, flowchart 1300 and 1400 each illustrate an embodiment of a method for determining match calculation factors for a unique ID that may be performed by the electronic device 100. While various match calculation factors are described herein with reference to FIGS. 13 and 14, match calculation factors may be added or omitted in alternative embodiments. Additionally, the order in which the match calculation factors are determined may be different in alternative embodiments. The match calculation factors may be implemented as point values, rank indicators, percentages, probabilities, or other identifications suitable for comparison. In some embodiments, point values may be assigned based on a partial or full match between a received unique ID and authentication data or unique IDs stored in the database 308. Match calculation factors may be shared or unique to each authentication component 110. Shared match calculation factors may have the same or unique values for each authentication component 110.

Referring to FIG. 13, the flowchart 1300 may be performed for a non-biometric authentication component. The match component 304 obtains (1302) authentication data from the historical database 308 (e.g., from the authorized table 330 or the continuous table 310) for a unique ID received from an authentication component 110. If the received unique ID is not found in the authorized table 330, the match component 304 may skip to a next received unique ID. The match component 304 may assign a point value (e.g., a minimum point value) if the unique ID is not found in the database 308 before skipping to the next received unique ID. If authentication data is found (e.g., under a stored unique ID within the database 308), the match component 304 may assign a base point value for the unique ID. The match component 304 then determines the match calculation factors based on the authentication data for the stored unique ID. The authentication data may include at least one of the stored unique ID, an authorized time period (e.g., an authorized start time and authorized end time), an authorized day (or days), or a last access date.

The match component 304 may determine (1304) a match calculation factor based on a time range, for example, a comparison of a time for the current unlock attempt (e.g., a current time) and the authorized time period. In one embodiment, the match component 304 assigns a maximum point value (e.g., ten points) for the time range if the current time is between the authorized start time and the authorized end time. The match component 304 may assign a lower point value based on a proximity of the current time and the authorized start and end times. For example, the match component 304 may assign eight points if the current time is within two minutes, five points if the current time is within five minutes, and two points if the current time is within ten minutes. Alternative point values will be apparent to those skilled in the art.

The match component 304 may determine (1306) a match calculation factor based on a comparison of a day for the current unlock attempt (e.g., a current day) and the authorized days. In one embodiment, the match component 304 assigns a maximum point value (e.g., ten points) if the current day is an authorized day. The match component 304 may assign a lower point value based on a proximity of the current day and the authorized days. For example, the match component 304 may assign eight points if the current day is adjacent to an authorized day (e.g., Tuesday and Wednesday) or four points if the current day and the authorized days are weekdays. Alternative point values will be apparent to those skilled in the art.

The match component 304 may determine (1308) a closest match for the current time and the current day within the authorized table 330. For example, where multiple entries with separate authorized start and end times exist for a unique ID, the match component 304 may select the closest match for comparison. Referring to the authorized table 830 (FIG. 8) for example, if the unlock attempt is a Monday at 1:04 PM, the closest match is entry AT1. Upon determining the closest match, the match component 304 may determine (1310) a match calculation factor based on a comparison of the current day and the last access date for the closest match. In one embodiment, the match component 304 assigns a maximum point value (e.g., 10 points) if the last access date is within fourteen days of the current day. The match component 304 may assign a lower point value based on a proximity of the current day and the last access date. For example, the match component 304 may assign eight points if the proximity is eighteen days and four points if the proximity is twenty-one days. Alternative point values will be apparent to those skilled in the art.

The match component 304 may determine (1312) a match calculation factor based on a comparison of the received unique ID and a connected unique ID list (e.g., a continuous table entry) for the electronic device 100. For example, the match component 304 may determine whether the received unique ID is currently listed in the continuous table 310. Referring to FIG. 2, the unique IDs are stored (212) in the continuous table 310 after a successful unlock attempt as determined by a sufficient match (206) or a successful security challenge (208). Accordingly, if a received unique ID is stored in the continuous table 310, it may be inferred that the unique ID was previously part of a successful unlock attempt and thus more likely to suggest that the current unlock attempt is authorized. In one embodiment, the match component 304 assigns a maximum point value (e.g., ten points) for the continuous table entry if the current time is within two minutes of the continuous table entry. The match component 304 may assign a lower point value based on a proximity of the current time and the continuous table entry. For example, the match component 304 may assign eight points if the current time is within three minutes, five points if the current time is within five minutes, and two points if the current time is within ten minutes. Alternative point values will be apparent to those skilled in the art.

In addition to the above-mentioned match calculation factors, the match component 304 may determine (1314) one or more match calculation factors that are specific to an authentication component 110. As one example, the match component 304 may assign an additional ten points for a unique ID from the WiFi component 112 that corresponds to a secure wireless network, as opposed to a non-secured wireless network. In another example, the match component 304 determines a match calculation factor based on a device class associated with the received unique ID. For example, a device class for a Bluetooth device may indicate whether the Bluetooth device is a stationary device (e.g., a desktop personal computer), a semi-portable (e.g., an automobile), or mobile device (e.g., a laptop, mobile phone, or headset). The match component 304 in one embodiment uses the device class as a separate match calculation value, for example, ten points for a stationary device, six points for a semi-portable device, and three points for a mobile device. In another embodiment, the match component 304 uses the device class as a weight for the other component match factors for the unique ID, for example, weighting the other factors by 100% for the stationary device, 95% for the semi-portable device, and 90% for the mobile device.

In one embodiment, the match component 304 assigns a lower base point value for a unique ID that is the only unique ID in the authorized table 330 for an authentication component 110 than for other unique IDs. For example, where a unique ID from the WiFi component 112 is received and is the only unique ID in the authentication table 330 for the WiFi component 112, a base point value of forty points may be assigned, while if several unique IDs exist in the authentication table 330 for the WiFi component 112, a base point value of fifty points may be assigned.

Referring to FIG. 14, the flowchart 1400 may be performed for a biometric authentication component (e.g., the swipe component 116, the grip component 117, the image component 118, or audio component 119). The match component 304 obtains (1402) a biometric profile from the authentication table 330. The match component 304 may determine a match calculation factor based on a comparison of the received unique ID and a stored unique ID (e.g., the biometric profile). The match component 304 may compare (1404) the received unique ID with the biometric profile. The match component 304 determines (1406) a point value based on the comparison (e.g., a biometric confidence match) where a higher point value corresponds to a higher confidence match.

Figure 15:
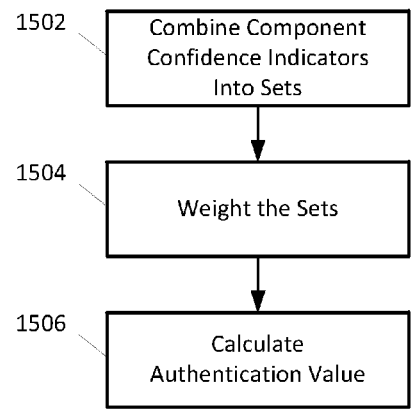
FIG. 15 is a flowchart of a method for combining component confidence indicators that may be performed by the electronic device of FIG. 1, according to an embodiment.

Turning to FIG. 15, a flowchart 1500 illustrates an embodiment of a method for combining component confidence indicators that may be performed by the electronic device 100. The match component 304 groups (1502) the plurality of component confidence indicators into at least first and second sets. In one embodiment, the sets correspond to biometric and non-biometric sets. In another embodiment, the sets may correspond to high importance and low importance sets. The match component 304 may determine a first set confidence indicator, based on the component confidence indicators of the first set, and a second set confidence indicator, based on the component confidence indicators of the second set. The match component 304 weights (1504) the first and second sets, based on an authentication factor for the first set. For example, where the first set is a biometric set, the match component 304 uses a biometric accuracy (e.g., from the match-ready table 340) to weight both the first set and second set. Alternative authentication factors will be apparent to those skilled in the art. The match component 304 calculates (1506) the authentication value based on the weighted component confidence indicators for the first and second sets.

The match component 304 in one embodiment determines a first set confidence indicator A by combining a first component confidence indicator B of the first set and a second component confidence indicator C of the first set as $$A(B, C) = \frac{2 \cdot B \cdot C}{1 + (2B - 1) \cdot (2C - 1)},$$

as described in Kuhlman (U.S. Pat. No. 7,565,265), incorporated herein by reference in its entirety.

Where more than two component confidence indicators have been determined, the match component 304 may combine additional component confidence indicators D with the first set confidence indicator A as $$A(A, D) = \frac{2 \cdot A \cdot D}{1 + (2A - 1) \cdot (2D - 1)}.$$

The match component 304 in one embodiment determines a second set confidence indicator W by combining a third component confidence indicator X of the second set and a fourth component confidence indicator Y of the second set as $$W(X, Y) = \frac{2 \cdot X \cdot Y}{1 + (2X - 1) \cdot (2Y - 1)}.$$

Where more than two component confidence indicators have been determined, the match component 304 may combine additional component confidence indicators Z with the second set confidence indicator W as $$W(W, Z) = \frac{2 \cdot W \cdot Z}{1 + (2W - 1) \cdot (2Z - 1)}.$$

The match component 304 in one embodiment determines an authentication value F for a first set confidence indicator R, a second set confidence indicator S, and a first authentication factor T as $$F = (T \cdot R) + ((1 - T) * (2 * S - 1)).$$

It can be seen from the foregoing that a method and system for providing secure access to an electronic device have been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

The invention claimed is:

1. A method, on an electronic device for a wireless network, the method comprising:
    determining a plurality of component confidence indicators for a corresponding plurality of authentication components of the electronic device by, for each authentication component of the plurality of authentication components:
        obtaining authentication data from a historical database, wherein the authentication data is associated with an authentication component;
        determining a match calculation factor for the authentication component based on the authentication data;
        determining a component confidence indicator for the authentication component based on the match calculation factor;
    grouping the plurality of component confidence indicators into at least a first biometric set and a second non-biometric set, wherein a component confidence indicator of the first biometric set is associated with a biometric accuracy for the corresponding authentication component;
    determining a first set confidence indicator based on the component confidence indicators of the first biometric set;
    determining a second set confidence indicator based on the component confidence indicators of the second non-biometric set;
    determining an authentication value based on:
        the first set confidence indicator, weighted by a first authentication factor for the first biometric set and the biometric accuracy, and
        the second set confidence indicator, weighted by the first authentication factor and the biometric accuracy; and
    unlocking the electronic device based on the authentication value.

2. The method of claim 1, wherein determining the plurality of component confidence indicators further comprises:
    receiving a unique ID from the authentication component, wherein the unique ID is associated with a current unlock attempt on the electronic device, wherein the authentication data is associated with the received unique ID and comprises at least one of a stored unique ID, an authorized time period, an authorized day, or a last access date;
    wherein determining the plurality of match calculation factors comprises at least one of:
        determining a match calculation factor based on a comparison of the received unique ID and the stored unique ID;
        determining a match calculation factor based on a comparison of a time for the current unlock attempt and the authorized time period;

determining a match calculation factor based on a comparison of a day for the current unlock attempt and the authorized day; or determining a match calculation factor based on a comparison of the day for the current unlock attempt and the last access date.

3. The method of claim 2, wherein determining the plurality of match calculation factors comprises:
determining a match calculation factor based on a device class associated with the received unique ID.

4. The method of claim 2, wherein determining the plurality of match calculation factors comprises:
determining a match calculation factor based on a comparison of the received unique ID and a connected unique ID list for the electronic device.

5. The method of claim 2, wherein determining the plurality of match calculation factors comprises:
determining a point value for a match calculation factor based on a confidence match for the authentication data, wherein a higher point value corresponds to a higher confidence match.

6. The method of claim 1, wherein determining the first set confidence indicator comprises:
determining the first set confidence indicator A by combining a first component confidence indicator B of the first biometric set and a second component confidence indicator C of the first biometric set as $$A(B, C) = \frac{2 \cdot B \cdot C}{1 + (2B-1)(2C-1)}; \text{ and}$$

wherein determining the second set confidence indicator comprises:
determining the second set confidence indicator W by combining a third component confidence indicator X of the second non-biometric set and a fourth component confidence indicator Y of the second non-biometric set as $$W(X, Y) = \frac{2 \cdot X \cdot Y}{1 + (2X-1)(2Y-1)}.$$

7. The method of claim 6, wherein determining the first set confidence indicator further comprises:
combining an additional component confidence indicator D with the first set confidence indicator A as $$A(A, D) = \frac{2 \cdot A \cdot D}{1 + (2A-1)(2D-1)}.$$

8. The method of claim 6, wherein determining the second set confidence indicator further comprises:
combining an additional component confidence indicator Z with the first set confidence indicator W as $$W(W, Z) = \frac{2 \cdot W \cdot Z}{1 + (2W-1)(2Z-1)}.$$

9. The method of claim 1, wherein determining the authentication value comprises:

determining the authentication value F for a first set confidence indicator R, a second set confidence indicator S, and a first authentication factor T as $$F = (T \cdot R) + ((1-T)*(2*S-1)).$$

10. An electronic device for a wireless network, the electronic device comprising:
a non-transitory memory; and
a processor configured to retrieve instructions from the memory;
wherein:
the electronic device is configured to determine a plurality of component confidence indicators for a corresponding plurality of authentication components of the electronic device by, for each authentication component of the plurality of authentication components:
obtaining authentication data from a historical database, wherein the authentication data is associated with an authentication component;
determining a match calculation factor for the authentication component based on the authentication data;
determining a component confidence indicator for the authentication component based on the match calculation factor;
the electronic device is configured to group the plurality of component confidence indicators into at least a first biometric set and a second non-biometric set, wherein a component confidence indicator of the first biometric set is associated with a biometric accuracy for the corresponding authentication component;
the electronic device is configured to determine a first set confidence indicator based on the component confidence indicators of the first biometric set;
the electronic device is configured to determine a second set confidence indicator based on the component confidence indicators of the second non-biometric set;
the electronic device is configured to determine an authentication value based on the first set confidence indicator, weighted by a first authentication factor for the first biometric set and the biometric accuracy, and the second set confidence indicator, weighted by the first authentication factor and the biometric accuracy;
the electronic device is configured to unlock the electronic device based on the authentication value.

11. The electronic device of claim 10, wherein:
the electronic device is configured to receive a unique ID from the authentication component, wherein the unique ID is associated with a current unlock attempt on the electronic device, wherein the authentication data is associated with the received unique ID and comprises at least one of a stored unique ID, an authorized time period, an authorized day, or a last access date;
wherein the electronic device is configured to perform at least one of:
determine a match calculation factor based on a comparison of the received unique ID and the stored unique ID;
determine a match calculation factor based on a comparison of a time for the current unlock attempt and the authorized time period;
determine a match calculation factor based on a comparison of a day for the current unlock attempt and the authorized day; or
determine a match calculation factor based on a comparison of the day for the current unlock attempt and the last access date.

12. The electronic device of claim 10, wherein:
the electronic device is configured to determine a point value for a match calculation factor based on a confidence match for the authentication data, wherein a higher point value corresponds to a higher confidence match.

13. The electronic device of claim 10, wherein:
the electronic device is configured to determine the first set confidence indicator A by a combination of a first component confidence indicator B of the first biometric set and a second component confidence indicator C of the first biometric set as $$A(B, C) = \frac{2 \cdot B \cdot C}{1 + (2B - 1) \cdot (2C - 1)}; \text{ and}$$

the electronic device is configured to determine the second set confidence indicator W by a combination of a third component confidence indicator X of the second non-biometric set and a fourth component confidence indicator Y of the second non-biometric set as $$W(X, Y) = \frac{2 \cdot X \cdot Y}{1 + (2X - 1) \cdot (2Y - 1)}.$$

14. The electronic device of claim 13, wherein the electronic device is further configured to combine an additional component confidence indicator D with the first set confidence indicator A as $$A(A, D) = \frac{2 \cdot A \cdot D}{1 + (2A - 1) \cdot (2D - 1)}.$$

15. The electronic device of claim 13, wherein the electronic device is further configured to combine an additional component confidence indicator Z with the first set confidence indicator W as $$W(W, Z) = \frac{2 \cdot W \cdot Z}{1 + (2W - 1) \cdot (2Z - 1)}.$$

16. The electronic device of claim 10, wherein:
the electronic device is configured to determine the authentication value F for a first set confidence indicator R, a second set confidence indicator S, and a first authentication factor T as $$F=(T \cdot R)+((1-T)*(2*S-1)).$$

\* \* \* \* \*